Patented Oct. 30, 1928.

UNITED STATES PATENT OFFICE.

HAROLD GRAY, OF AKRON, OHIO, ASSIGNOR TO THE B. F. GOODRICH COMPANY, OF NEW YORK, N. Y., A CORPORATION OF NEW YORK.

METHOD OF BONDING RUBBER TO METAL.

No Drawing.    Application filed April 27, 1927.   Serial No. 187,113.

This application relates to a method for uniting rubber to metal, and particularly to ferrous metals, and has for an object to provide methods of the character indicated which will produce a firm, strong and durable union between vulcanized rubber and metals.

It has heretofore been proposed to unite rubber to metals by means of an intermediate bonding material and in certain instances satisfactory and commercial union of these materials has been obtained. Such materials as have been found to be satisfactory are however relatively expensive and their use for this reason is to some extent restricted. The purpose of the present invention is to provide an inexpensive method of uniting rubber to metals and one which will produce bonds of adequate strength to adapt its application to any of the common commercial constructions.

This invention is based upon the discovery that where sulphurchloride is brought into intimate contact with the cleansed surface of a metal and a body of vulcanizable rubber composition is placed thereon, upon vulcanization of the two under pressure a union of the metal to the rubber of a very high order of strength results. Sulphurchloride is a liquid at normal temperatures and may be applied to the metal surface in any well known manner. Best results are apparently obtained where the film of sulphurchloride upon the metal is continuous and in intimate contact with the metal and when so applied it has been found that extremely thin films of the sulphurchloride are sufficient to effect a satisfactory bond. In uniting vulcanized rubber to ferrous metals, experiments have shown that the sulphurchloride may be applied to the metal in a variety of manners and in a number of forms. It may be brushed on the metal, or sprayed thereon with the usual air gun. This latter method is preferred. The sulphurchloride may be spread upon the metal in its normal liquid form, or it may be admixed with benzol or other organic solvent in practically any proportions and spread on the metal, the benzol or other organic solvent evaporating to leave upon the metal a thin contacting film of the sulphurchloride, or the sulphurchloride may be admixed with finely comminuted carbon, such as gas black, to form a paste and the paste spread upon the metal. Where this latter method is used, a thin paste is preferable which paste may be painted or sprayed upon the metal. The sulphurchloride may even be spread upon the rubber composition to which coated surface the metal is then pressed and vulcanized under pressure. In any of the above embodiments, it is essential to best results that the sulphurchloride be in intimate contact with the metal and that the sulphurchloride film should be substantially continuous over the surface of the metal.

In order to illustrate the high qualities of the union obtained by the above indicated process, a duck fabric was frictioned on both sides with a curable rubber composition and the friction duck then covered with a rubber composition such as is normally used in tire treads to give an overall thickness to the rubber construction of 1/8". Steel plates having the surface thereof cleansed, as by sandblasting, were coated with the sulphurchloride in the several ways herein indicated, and the rubber slab placed on the coated metal. These constructions were then placed in a vulcanizing press and heated for 45 minutes at 294° F., a time and temperature sufficient to give to the rubber an optimum cure.

The samples thus constructed were prepared for test upon the well known Cooey machine and the friction pull, which is an index of the strength of the adhesion between the rubber and the metal, was determined upon this machine. In order to give a basis for comparison, construction similar to that hereinabove described but in which high grade rubber cements replace the sulphurchloride film were constructed, vulcanized and tested. These so-called controls show a friction pull of between one and two pounds per inch, which figure is used merely as a basis of comparison.

*Example 1.*—In accordance with the general method hereinabove described, sulphurchloride was sprayed upon a cleansed surface of a steel plate to form a continuous film thereon and the vulcanizable rubber construction placed thereon and vulcanized thereto in a press. This product was later tested on the Cooey machine and showed a friction pull of 23 pounds per inch.

*Example 2.*—In a similar construction, the sulphurchloride was sprayed upon the vulcanizable rubber composition and the cleansed surface of the metal laid on the coated rubber. This construction was placed in a press and vulcanized under the above noted conditions. A friction pull on the Cooey machine showed a friction pull of 31 pounds per inch.

*Example 3.*—A similar result was obtained where sulphur chloride was spread in a thin film on the surfaces to be united, both on the rubber composition and on the metal. The construction when vulcanized under the standard conditions hereinabove indicated disclosed a friction pull of 31 pounds per inch.

*Example 4.*—A variation of the above methods which has certain advantages in that it tends to prevent the displacement of the sulphurchloride film on the metal was carried out as follows: the sulphurchloride was spread in a thin film on the cleansed surface of the metal and then a thin coat of rubber cement was sprayed thereover. The metal thus coated was assembled with a vulcanizable rubber composition and vulcanized in a press, as in the previous examples. This product showed a friction pull of 32 pounds per inch.

*Example 5.*—With the idea of obtaining a more intimate contact of the film of sulphurchloride with the metal, and also possibly a thinner film, a 16% solution of sulphurchloride in benzol was sprayed on a cleansed surface of the metal, the benzol permitted to evaporate substantially in toto and a vulcanizable rubber construction placed thereon and cured in contact in a press. This construction showed on test a friction pull of 37 pounds per inch. The percent of sulphurchloride in the benzol solution was varied in other experiments it being found that higher percentages of sulphurchloride in the solution operate in a satisfactory manner and that lower percentages may also be used, an 8% solution of sulphurchloride in benzol giving a friction pull of 14 pounds per inch.

*Example 6.*—A thin paste of gasblack and sulphurchloride was formed and sprayed upon the cleansed surface of metal, a vulcanizable rubber composition was placed thereon and vulcanized in contact therewith under the same conditions as in the previous example. When tested with the Cooey machine a friction pull of 32 pounds per inch was shown which however does not represent the strength of the bond since the rubber construction tore internally and the bond of the rubber to the metal was not destroyed.

*Example 7.*—In another modification, sulphurchloride was added to a 10% solution of rubber in benzol and the admixture sprayed on the metal before jelling set in. A vulcanizable rubber construction was applied to the treated metal surface and vulcanized in contact therewith as before. A test of the completed construction showed a friction pull of 26 pounds per inch.

It will be seen from a comparison of the results obtained in the several experiments hereinabove noted that the strength of the bond between the rubber and the metal was of the order of 15 to 20 times greater in strength than that of the control constructions in which rubber cements were employed. The strength of the bond obtained is much higher than that required in commercial constructions generally made of metal and rubber united, such as the lining of tanks, pipes, etc. for use in storing and handling corrosive chemicals, or in the manufacture of spouts and other conduits for handling water abrasive materials. For this and similar uses the construction of the present application is well adapted.

While numerous examples have been herein given of methods of employing sulphurchloride as a means of uniting rubber and metals, it is to be understood that numerous other variations and modifications may be made without departing from the principles of this invention.

I claim:

1. The method of bonding vulcanized rubber to metal which comprises superposing a vulcanizable rubber composition on the metal with a film comprising sulphurchloride, directly contacting the metal and vulcanizing the rubber composition in contact with the metal at usual heat vulcanizing temperatures.

2. The method of bonding rubber to a ferrous metal which comprises superposing a vulcanizable rubber composition on the metal, a layer of a material composed at least in part of sulphurchloride being interposed therebetween and subjecting the assemblage under pressure to usual heat vulcanizing temperatures.

3. The method of bonding rubber and a ferrous metal which comprises cleansing the contacting surface of the metal, coating the same with a composition comprising sulphurchloride, directly contacting the metal, superposing on the coated surface a vulcanizable rubber composition, and vulcanizing the rubber in pressure contact with the metal at usual heat vulcanizing temperatures.

4. The method of bonding rubber and a ferrous metal which comprises coating a cleansed surface of metal directly with a composition comprising sulphurchloride, coating the surface of the rubber composition to be bonded directly with a composition comprising sulphurchloride, superposing the bodies one on the other with the coated surfaces in contact, and vulcanizing the rubber composition in pressure contact with the metal at usual heat vulcanizing temperatures.

5. The method of bonding rubber and a ferrous metal which comprises coating the surface to be bonded of one of the materials with a composition comprising sulphurchloride, juxtaposing the metal and rubber with the surfaces to be bonded directly in contact with the sulphurchloride composition, and vulcanizing the rubber composition at usual heat vulcanizing temperatures.

6. The method of bonding bodies of rubber and ferrous metals which comprises coating at least one surface of each pair of surfaces to be bonded of said bodies directly with a composition comprising sulphurchloride, juxtaposing the bodies to bring the surfaces to be bonded in direct contact with the sulphurchloride composition, and vulcanizing the rubber composition in pressure contact with the metal at usual heat vulcanizing temperatures.

7. A composite construction comprising a vulcanized rubber composition and a ferrous metal bonded thereto during vulcanization at usual heat vulcanizing temperatures of the rubber composition through the intermediary of a composition comprising sulphurchloride in direct contact with the metal surface.

In witness whereof I have hereunto set my hand this 20th day of April, 1927.

HAROLD GRAY.